Patented July 21, 1931

1,815,144

UNITED STATES PATENT OFFICE

RICHARD HERZ, OF FRANKFORT-ON-THE-MAIN, AND WILHELM HECHTENBERG, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

FAST SULPHUR DYESTUFFS AND PROCESS OF MAKING SAME

No Drawing. Application filed August 16, 1929, Serial No. 386,482, and in Germany September 13, 1928.

Our present invention relates to new valuable sulphur dyestuffs dyeing bluish to green shades.

They are obtainable by causing a sulfurizing agent to act upon 2-(4'-hydroxy-arylamino)-6-arylamino-naphthalenes of the general formula:

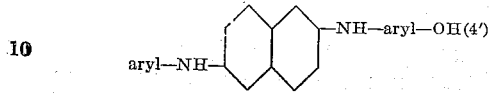

wherein the aryl residues may contain further substituents.

The starting material for our process may be produced for instance by treating a 6-arylamino-2-hydroxy-naphthalene-3-carboxylic acid with a para-hydroxy-arylamine in the presence of an alkali metal bisulfite, whereby the hydroxy-group is replaced by a hydroxy-arylamino-group and the carboxylic-group is simultaneously split off (see U. S. application Serial No. 386481, filed August 16, 1929).

The sulfurizing process is advantageously carried out by means of an alkali metal polysulfide of a high percentage of sulphur in the presence of an inert organic liquid which is a good solvent alike for the starting material to be sulfurized and for the polysulfide, such as alcohols of the fatty series of a higher boiling point, cyclic alcohols or glycerol.

The dyestuffs thus produced are distinguished by a great tinctorial power and dye cotton from the sodium sulfide bath or from the hydrosulfite vat bluish to green shades of a very good fastness especially to light and to washing. Sulphur dyestuffs of such shades and fastness properties are unknown hitherto.

Dyestuffs of considerably greener shades are obtainable, when the sulfurizing process is carried out in the presence of copper salts, such as copper sulfide, sulfate or complex cuprous alkali cyanides.

In order to further illustrate our invention the following examples are given, the parts being by weight and all temperatures in centigrade degrees. We wish it however to be understood, that we are not limited to the particular conditions nor to the specific products mentioned therein:—

Example 1

100 parts of 2-(4'-hydroxy-phenylamino)-6-phenylamino-naphthalene are boiled under a reflux condenser for 30-40 hours with an alcoholic polysulfide solution prepared from 95 parts of concentrated sodium sulfide, 150 parts of sulphur and 450 parts of ethyl alcohol. When the reaction is finished the alcohol is distilled off, the residue is worked up in the ordinary manner and freed if necessary from the adhering sulphur.

The dyestuff thus formed dissolves difficultly in concentrated sulfuric acid with a greenish blue tint, dissolves in a sodium sulfite solution to a yellowish brown solution and dyes cotton from this solution or from the hydrosulfite vat bluish green shades. These dyeings are fast to light and especially to washing.

When 8 parts of copper sulfide or cuprous cyanide are added to the melting mass, a dyestuff is obtained which dissolves difficultly in concentrated sulfuric acid with a blue tint and dyes cotton green shades.

The duration of the sulfurizing reaction may be considerably shortened by substituting the ethyl alcohol applied by higher boiling alcohols of the fatty or cyclic series.

When in this example 2-(4'-hydroxyphenylamino)-6-phenylamino-naphthalene is replaced by the corresponding 2-(3'.5'-dichloro-4'-hydroxy-phenylamino)-compound, a dyestuff of similar properties is produced.

Example 2

2-(4'-h y d r o x y-phenylamino)-6-(4'-methoxy-phenylamino)-naphthalene are treated with polysulfide as described in Example 1. The dyestuff thus produced shows nearly the same properties of fastness as that of Example 1, but dyes cotton somewhat more greenish shades.

We claim:—

1. The process which comprises heating with a sulfurizing agent a 2-(4'-hydroxyarylamino)-6-arylamino-naphthalene of the general formula:

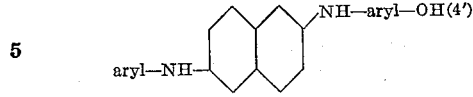

wherein the aryl residues may contain further substituents in the presence of a copper compound.

2. The process which comprises heating with a sulfurizing agent a 2-(4'-hydroxy-arylamino)-6-arylamino-naphthalene of the general formula:

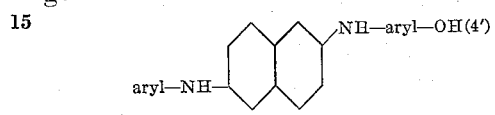

wherein the aryl residues may contain further substituents.

3. The process which comprises treating a 2-(4'-hydroxy-arylamino)-6-arylamino-naphthalene of the general formula:

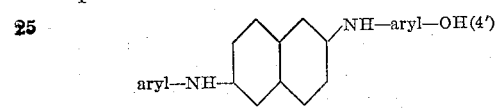

wherein the aryl residues may contain further substituents, with an alkali metal polysulfide of a high percentage of sulfur in the presence of an alcohol and with the addition of a copper compound.

4. The process which comprises treating a 2-(4'-hydroxy-arylamino)-6-arylamino-naphthalene of the general formula:

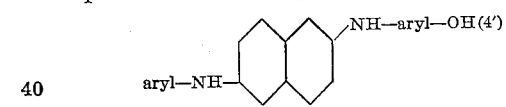

wherein the aryl residues may contain further substituents, with an alkali metal polysulfide of a high percentage of sulphur in the presence of an alcohol.

5. The process which comprises heating with a sulfurizing agent 2-(4'-hydroxy-phenylamino)-6-phenylamino-naphthalene of the formula:

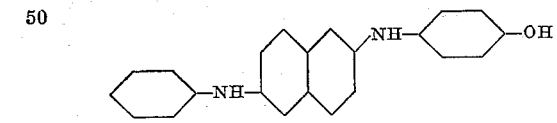

with the addition of a copper compound.

6. The process which comprises heating with a sulfurizing agent 2-(4'-hydroxy-phenylamino)-6-phenylamino-naphthalene of the formula:

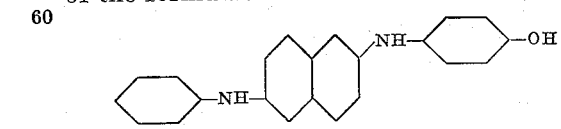

7. The process which comprises treating 2-(4'-hydroxy-phenylamino)-6-phenylamino-naphthalene of the formula:

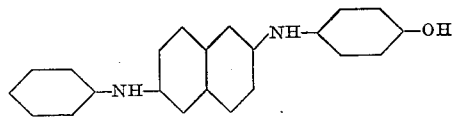

with an alkali metal polysulfide of a high percentage of sulphur in the presence of an alcohol and with the addition of a copper compound.

8. The process which comprises treating 2-(4'-hydroxy-phenylamino)-6-phenylamino-naphthalene of the formula:

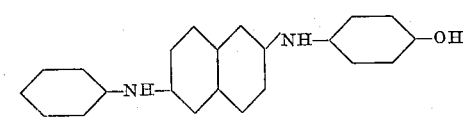

with an alkali metal polysulfide of a high percentage of sulphur in the presence of an alcohol.

9. As new products the sulphur dyestuffs obtainable by acting with a sulfurizing agent upon a 2-(4'-hydroxy-arylamino)-6-arylamino-naphthalene of the general formula:

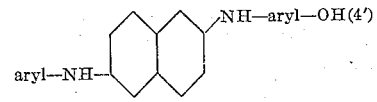

wherein the aryl residues may contain further substituents, in the presence of a copper compound, which products are when dry dark colored powders, difficultly soluble in concentrated sulfuric acid with bluish to greenish tints, soluble in an alkali metal sulfide solution and dyeing therefrom and from the hydrosulfite vat bluish to green shades of a very good fastness to light and especially to washing.

10. As new products the sulphur dyestuffs obtainable by acting with a sulfurizing agent upon a 2-(4'-hydroxy-arylamino)-6-arylamino-naphthalene of the general formula:

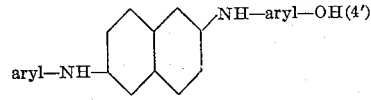

wherein the aryl residues may contain further substituents, which products are when dry dark colored powders, difficultly soluble in concentrated sulfuric acid with bluish to greenish tints, soluble in an alkali metal sulfide solution and dyeing therefrom and from the hydrosulfite vat bluish to green shades of a very good fastness to light and especially to washing.

11. As new products the sulphur dyestuffs obtainable by treating a 2-(4'-hydroxy-arylamino)-6-arylamino-naphthalene of the general formula:

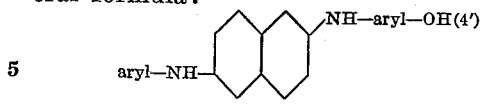

wherein the aryl residues may contain further substituents, with an alkali metal polysulfide of a high percentage of sulphur in the presence of an alcohol and with the addition of a copper compound, which products are when dry dark colored powders, difficultly soluble in concentrated sulfuric acid with bluish to greenish tints, soluble in an alkali metal sulfide solution and dyeing therefrom and from the hydrosulfite vat bluish to green shades of a very good fastness to light and especially to washing.

12. As new products the sulphur dyestuffs obtainable by treating a 2-(4'-hydroxy-arylamino)-6-arylamino-naphthalene of the general formula:

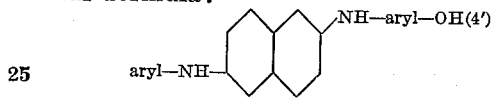

wherein the aryl residues may contain further substituents, with an alkali metal polysulfide of a high percentage of sulphur in the presence of an alcohol, which products are when dry dark colored powders, difficultly soluble in concentrated sulfuric acid with bluish to greenish tints, soluble in an alkali metal sulfide solution and dyeing therefrom and from the hydrosulfite vat bluish to green shades of a very good fastness to light and especially to washing.

13. As a new product the sulphur dyestuff obtainable by treating a 2-(4'-hydroxy-phenylamino)-6-phenylamino-naphthalene of the formula:

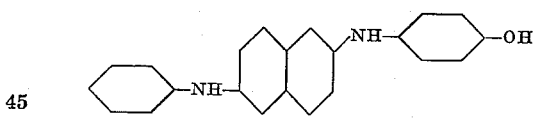

which product represents a dark colored powder, difficultly soluble in concentrated sulfuric acid with a greenish blue tint, soluble in sodium sulfide to a yellowish brown solution and dyes cotton from this solution and from the vat bluish green shades of a very good fastness to light and especially to washing.

In testimony whereof, we affix our signatures.

RICHARD HERZ.
WILHELM HECHTENBERG.